United States Patent
Uprit et al.

(10) Patent No.: US 12,211,098 B2
(45) Date of Patent: Jan. 28, 2025

(54) BLOCKCHAIN-BASED DIGITAL EXCHANGE PLATFORM WITH REDUCED LATENCY AND INCREASED SECURITY AND EFFICIENCY

(71) Applicant: Bank of America Corporation, Charlotte, NC (US)

(72) Inventors: Saurabh Uprit, Chennai (IN); Amar Rajendra Tayade, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 301 days.

(21) Appl. No.: 17/708,181

(22) Filed: Mar. 30, 2022

(65) Prior Publication Data
US 2023/0316397 A1   Oct. 5, 2023

(51) Int. Cl.
G06Q 40/04   (2012.01)

(52) U.S. Cl.
CPC ................... *G06Q 40/04* (2013.01)

(58) Field of Classification Search
None
See application file for complete search history.

(56) References Cited

U.S. PATENT DOCUMENTS

| | | | |
|---|---|---|---|
| 10,762,479 B2 | 9/2020 | Hyun et al. | |
| 11,093,649 B2 | 8/2021 | Dunjic et al. | |
| 2020/0151686 A1* | 5/2020 | Komandur | G06F 16/2315 |
| 2022/0067738 A1* | 3/2022 | Fang | G06Q 20/389 |

OTHER PUBLICATIONS

Michael C. Bodson, "The Potential for Distributed Ledger Technology to Transform Markets," https://www.dtcc.com/dtcc-connection/articles/2021/december/14/the-potential-for-dlt-to-transform-markets, Dec. 14, 2021.
Haohan Xu, "Blockchain Technology will Remove Barriers to Instant International Settlement," https://www.bankingdive.com/news/blockchain-technology-instant-international-settlements/581726/, Jul. 16, 2020.
Philipp Sandner, "Will Blockchain Replace Clearinghouses? A Case of DVP Post-Trade Settlement," https://www.forbes.com/sites/philippsandner/2020/12/02/will-blockchain-replace-clearinghouses-a-case-of-dvp-post-trade-settlement/?sh=1edebe45408f, Dec. 2, 2020.

* cited by examiner

*Primary Examiner* — Joseph W. King
*Assistant Examiner* — Liz P Nguyen
(74) *Attorney, Agent, or Firm* — Weiss & Arons LLP (57) ABSTRACT

Systems and methods for executing a transaction with reduced latency and increased security and efficiency on a blockchain-based digital platform are provided. Methods may include establishing a first blockchain node associated with a first entity, identifying cross listed assets of the first entity, calculating an execution suitability index for each asset, selecting a target asset for liquidation, and establishing a second blockchain node associated with a second entity. Methods may also include receiving an agreement from the second entity to acquire the target asset from the first entity, recording the agreement on the blockchain, receiving an authorization from a financial institution to advance funds on behalf of the second entity to the first entity, transferring the funds from the financial institution to the first entity, recording the transfer of the funds on the blockchain, executing the acquisition of the target asset, and recording the acquisition of the target asset on the blockchain.

13 Claims, 6 Drawing Sheets

BLOCKCHAIN-BASED DIGITAL EXCHANGE PLATFORM WITH REDUCED LATENCY AND INCREASED SECURITY AND EFFICIENCY

FIELD OF TECHNOLOGY

Aspects of the disclosure relate to digital platforms. Specifically, aspects of the disclosure relate to blockchain-based digital exchange platforms.

BACKGROUND OF THE DISCLOSURE

Typically, asset transactions are executed on platforms that are associated with many deficiencies. For example, many trading platforms are limited in scope to certain geographical areas, certain currencies, and/or certain asset exchanges. Many trading platforms are unable to execute trades in real-time. Many trading platforms are restricted by asset exchanges being open or closed for trading. Many trading platforms also lack robust security measures for protecting the integrity of trades.

An entity with assets may want to trade or liquidate those assets immediately. The entity may want to trade the assets across borders and/or for alternative currencies. The entity may want to trade the assets even when traditional asset exchanges are closed for trading. The entity may also want to trade using a platform with robust security measures for protecting the integrity of the trades.

It would be desirable, therefore, to provide systems and methods for asset exchanges that can execute trades in real-time and across geographical borders and/or asset exchanges. It would be further desirable for the systems and methods to execute trades even when traditional asset exchanges are closed for trading. It would be still further desirable for the systems and methods to incorporate robust security measures for protecting the integrity of the trades.

SUMMARY OF THE DISCLOSURE

Aspects of the disclosure relate to a blockchain-based digital platform for executing a transaction with reduced latency and increased security and efficiency. The platform may include a blockchain. The blockchain may include a distributed ledger.

The blockchain may include a first node. The first node may include a first computer system associated with a first entity. The first computer system may host the distributed ledger.

The blockchain may include a second node. The second node may include a second computer system associated with a second entity. The second computer system may also host the distributed ledger.

The platform may include an artificial intelligence ("AI") engine. The AI engine may be configured to identify a set of assets of the first entity. The set of assets may include assets that are cross listed in a plurality of asset exchanges. The AI engine may be configured to calculate an execution suitability index for each asset in the set of assets. The execution suitability index of an asset may represent a measure of a level of suitability to execute a liquidation of the asset.

The AI engine may be configured to select a target asset from the set of assets. The target asset may be the asset from the set of assets with the highest execution suitability index that also conforms to a set of rules. The set of rules may be established by the first entity. The set of rules may include an asset category and a transaction limit.

The platform may include a communication interface, a processor, and a non-transitory memory storing computer code that, when run on the processor, may be configured to execute some or all of the platform features.

The platform may be configured to receive, via the communication interface, an agreement from the second entity to acquire the target asset from the first entity. The platform may be configured to record the agreement on the distributed ledger. The platform may be configured to receive, via the communication interface, an authorization from a financial institution to advance funds on behalf of the second entity to the first entity for acquisition of the target asset. The platform may be configured to transfer the funds from the financial institution to the first entity and record the transfer of the funds on the distributed ledger. The platform may be configured to execute the acquisition of the target asset and record the acquisition of the target asset on the distributed ledger.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A blockchain-based digital platform for executing a transaction with reduced latency and increased security and efficiency is provided. The platform may include a blockchain. The blockchain may include a distributed ledger. A distributed ledger may include a plurality of coordinated databases. Coordinating the databases may, for example, include syncing the databases based on a consensus. Each coordinated database may be stored on a distinct node from a plurality of nodes. Each coordinated database may include linked blocks of hashed data. A block that is linked to a previous block may include a hashing of the hashed data of the previous block. In certain embodiments, the data may be encrypted. In other embodiments, the data may not be hashed or encrypted. The link between the blocks may include a pointer.

Each one of the databases of the distributed ledger may be stored on a distinct one of a plurality of nodes. When the distributed ledger is initialized or updated, a data block containing data associated with the initialization/update may be created on each of the nodes. The data block may be linked to the most recent pre-update data block.

A distributed ledger may be part of a blockchain. A blockchain is a distributed database of records or public ledger of all transactions or digital events that have been executed and shared among participants. Each transaction or digital event in the public ledger is verified by a majority of participants included in the system. Once a transaction or digital event is executed, it can never be erased. The blockchain therefore contains an immutable and verifiable record of each transaction or event. An encrypted blockchain also provides a secure and anonymous architecture for storing sensitive information.

A distributed electronic ledger may store records in any suitable format. For example, records may be stored sequentially as they are generated, one after the other in a continuous ledger. Records may be stored in blocks, such as in a blockchain.

Records stored in a distributed electronic ledger may only be added to the ledger when the participants responsible for maintaining the distributed ledger (e.g., participant devices or nodes) reach a consensus. The distributed ledger may use any suitable consensus algorithm such as Proof of Work, Proof of Stake or Practical Byzantine Fault Tolerance.

The distributed ledger may be a public or unpermissioned distributed ledger. A public distributed ledger does not have restrictions on who may participate in establishing a consensus for adding a new record.

The distributed ledger may be a private or permissioned distributed ledger. A private distributed ledger has restrictions on who may participate in establishing a consensus for adding a new record.

The distributed ledger may utilize a combination of private and public participation in establishing a consensus. For example, the distributed ledger may require a threshold number of private and/or public votes before recording a transaction on the distributed ledger. Utilization of private entities may allow for achieving a consensus (or rejection) of a transaction faster than wholly public distributed ledgers.

The distributed ledger may include a blockchain of electronic data records. Each record may be authenticated by a consensus protocol. A complete copy of the blockchain may be stored on multiple computer systems. Each computer system that stores a copy of the blockchain may be a "node."

Groups of authenticated transactions may be gathered into "blocks." A node may add a "block" to the blockchain. Each block may include data and metadata. Metadata may include a reference to the previous block in the chain and a unique identifier associated with the previous block. The unique identifier may be an output of a hash function.

The blockchain may include a first node. The first node may include a first computer system associated with a first entity. The first computer system may host the distributed ledger.

The blockchain may include a second node. The second node may include a second computer system associated with a second entity. The second computer system may also host the distributed ledger.

The platform may include an artificial intelligence ("AI") engine. The AI engine may include a processor, memory, and computer code. The AI engine may include machine-learning ("ML") modules that are trained using data sets. The AI engine may be, at least partially, cloud based.

The AI engine may be configured to identify a set of assets of the first entity. The set of assets may include assets that are cross listed in a plurality of asset exchanges. Cross listed assets may include, for example, assets that are available to be traded on exchanges in different markets (e.g., a stock that is available on an exchange in the USA and in one or more other countries such as India). In some embodiments, one of the plurality of asset exchanges may include a cryptocurrency exchange.

The AI engine may be configured to calculate an execution suitability index for each asset in the set of assets. The execution suitability index of an asset may represent a measure of a level of suitability to execute a liquidation of the asset. The execution suitability index may be a numerical score.

In some embodiments, the execution suitability index of each asset may be calculated based on multiple parameters. The parameters may represent factors for determining a measure of how optimal it is to liquidate a certain asset in a certain market. The parameters may, for example, include: a measure of past performance of the asset, a measure of predicted future performance of the asset, and a measure of which exchange from the plurality of asset exchanges is most advantageous for liquidating the asset.

In certain embodiments, the AI engine may include a foreign exchange interface. The foreign exchange interface may be configured to compile exchange rates between currencies associated with the plurality of asset exchanges. The exchange rates may be used as a factor in calculating the execution suitability indexes. For example, even if a particular asset is not performing poorly, and might not be associated with a high execution suitability index by virtue of performance alone, if that asset is available for trade in a market with a favorable exchange rate, the execution suitability index may be increased accordingly.

In some embodiments, the AI engine may include an event interface. The event interface may be configured to receive, as input, a live feed of news events sourced from online media outlets and/or social media. The news events may be used as a factor in calculating the execution suitability indexes. For example, the AI engine may predict based on certain news events, that a particular asset in a particular market might begin to perform poorly. The prediction may be based on historical trends present in data sets used to train the AI engine.

The AI engine may be configured to select a target asset from the set of assets. The target asset may be the asset from the set of assets with the highest execution suitability index that also conforms to a set of rules. The set of rules may be established by the first entity. The set of rules may include an asset category and a transaction limit.

A transaction limit may, for example, be a maximum monetary amount for the transaction. The transaction limit may also be a maximum number of assets, such as shares of stock, for the transaction. An asset category may be, for example, something like "tech stocks." The asset might be somewhat more specific, like, for example, "electric vehicles." In certain embodiments, the asset category can be as broad as "all assets" or "all stocks" or as narrow as a particular asset such as a specific stock.

In some embodiments, the set of rules may be recorded on the distributed ledger. Recording the set of rules on the distributed ledger may provide a visible, immutable, record of the conditions under which the transaction was agreed upon. It may also provide an accessible location for participating entities to view conditions under which another entity wishes to execute a future transaction, thereby facilitating a trusted environment with efficient and immediate information exchange.

The platform may include a communication interface. The communication interface may include a connection to a private or public network, such as the internet. The platform may include a processor and a non-transitory memory storing computer code (which may be alternatively referred to herein as computer instructions or computer executable instructions). The computer code, when run on the processor, may be configured to execute some or all of the platform features. The platform may, in some embodiments, be wholly or partially cloud based.

The platform may be configured to receive, via the communication interface, an agreement from the second entity to acquire the target asset from the first entity. The platform may be configured to record the agreement on the distributed ledger. The platform may be configured to receive, via the communication interface, an authorization from a financial institution to advance funds on behalf of the second entity to the first entity for acquisition of the target asset. The platform may be configured to transfer the funds from the financial institution to the first entity and record the transfer of the funds on the distributed ledger. The platform may be configured to execute the acquisition of the target asset and record the acquisition of the target asset on the distributed ledger.

In some embodiments, the platform may include a third node of the blockchain. The third node may include a third computer system associated with the financial institution. The distributed ledger may also be hosted on the third computer system.

In certain embodiments, the platform may include a fourth node of the blockchain. The fourth node may include a fourth computer system associated with the AI engine. The distributed ledger may also be hosted on the fourth computer system.

In some embodiments, the blockchain may be private. In some embodiments, the blockchain may be public. In some embodiments, the blockchain may be open for any participating entity to be a node. A participating entity may, for example, include entities looking to buy or sell assets, financial institutions willing to participate in the financial aspect of the transactions (e.g., transfers of funds), and entities contributing to the computing of the platform (e.g., the AI engine).

In certain embodiments, the platform may be configured to execute the acquisition of the target asset even when the plurality of asset exchanges are closed for trading. The advancement of the funds together with the decentralized nature of recordation on the blockchain may contribute to enabling the platform to execute transactions almost immediately, between entities across the globe, and at any time of the day, even when exchanges that are associated with the assets being transacted are closed for trading.

A method for executing a transaction with reduced latency and increased security and efficiency on a blockchain-based digital platform is provided. The method may include establishing a first blockchain node associated with a first entity, identifying cross listed assets of the first entity, calculating an execution suitability index for each asset, selecting a target asset for liquidation, and/or establishing a second blockchain node associated with a second entity. The method may also include receiving an agreement from the second entity to acquire the target asset from the first entity, recording the agreement on the blockchain, receiving an authorization from a financial institution to advance funds on behalf of the second entity to the first entity, transferring the funds from the financial institution to the first entity, recording the transfer of the funds on the blockchain, executing the acquisition of the target asset, and/or recording the acquisition of the target asset on the blockchain.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
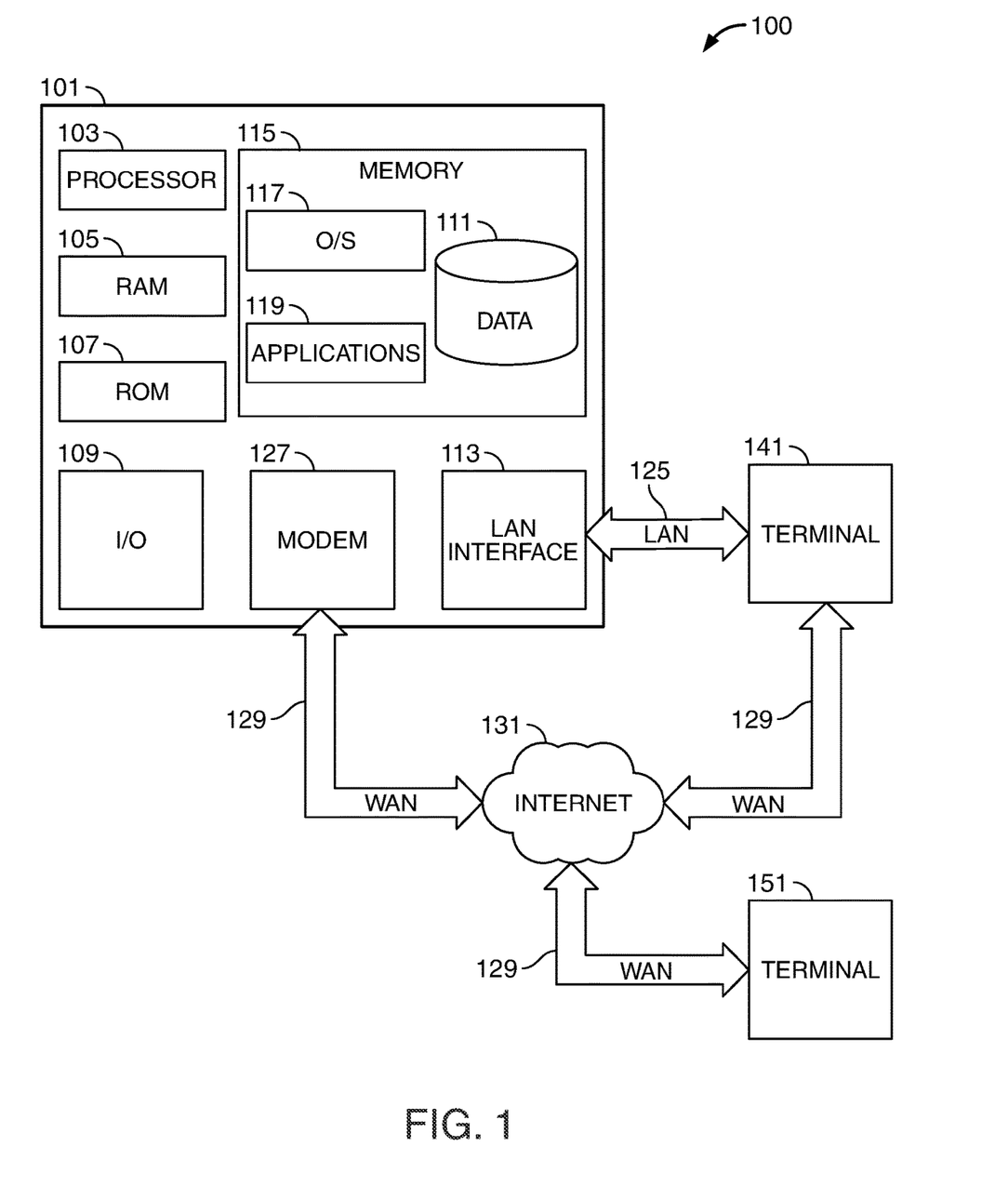
FIG. 1 shows an illustrative system in accordance with principles of the disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to asset transactions and/or blockchain processing and recordation. The input/output module may also include one or more speakers for providing audio output and a video display device for providing textual, audio, audiovisual, and/or graphical output. The input and output may be related to computer application functionality. The input and output may be related to asset transactions and/or blockchain processing and recordation.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to asset transactions and/or blockchain processing and recordation.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
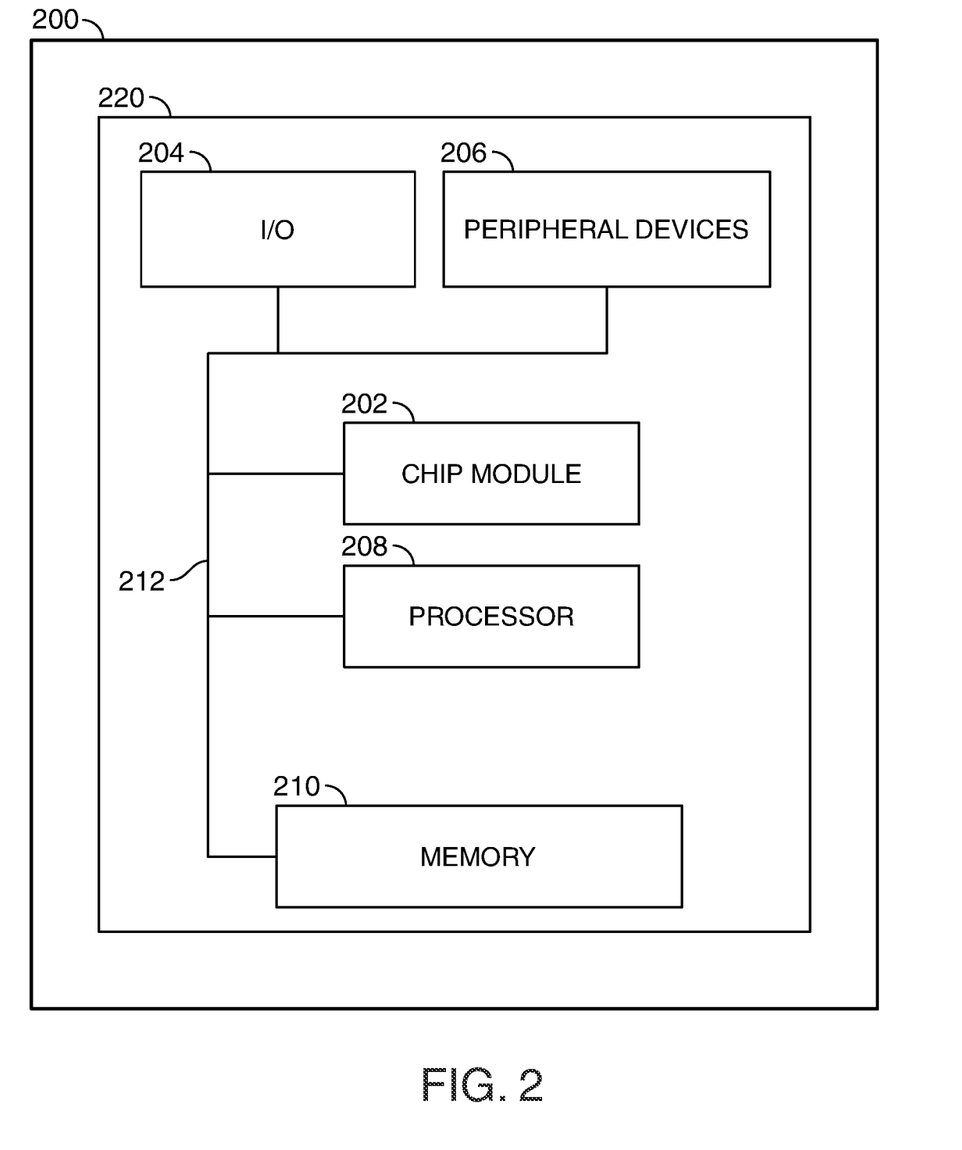
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
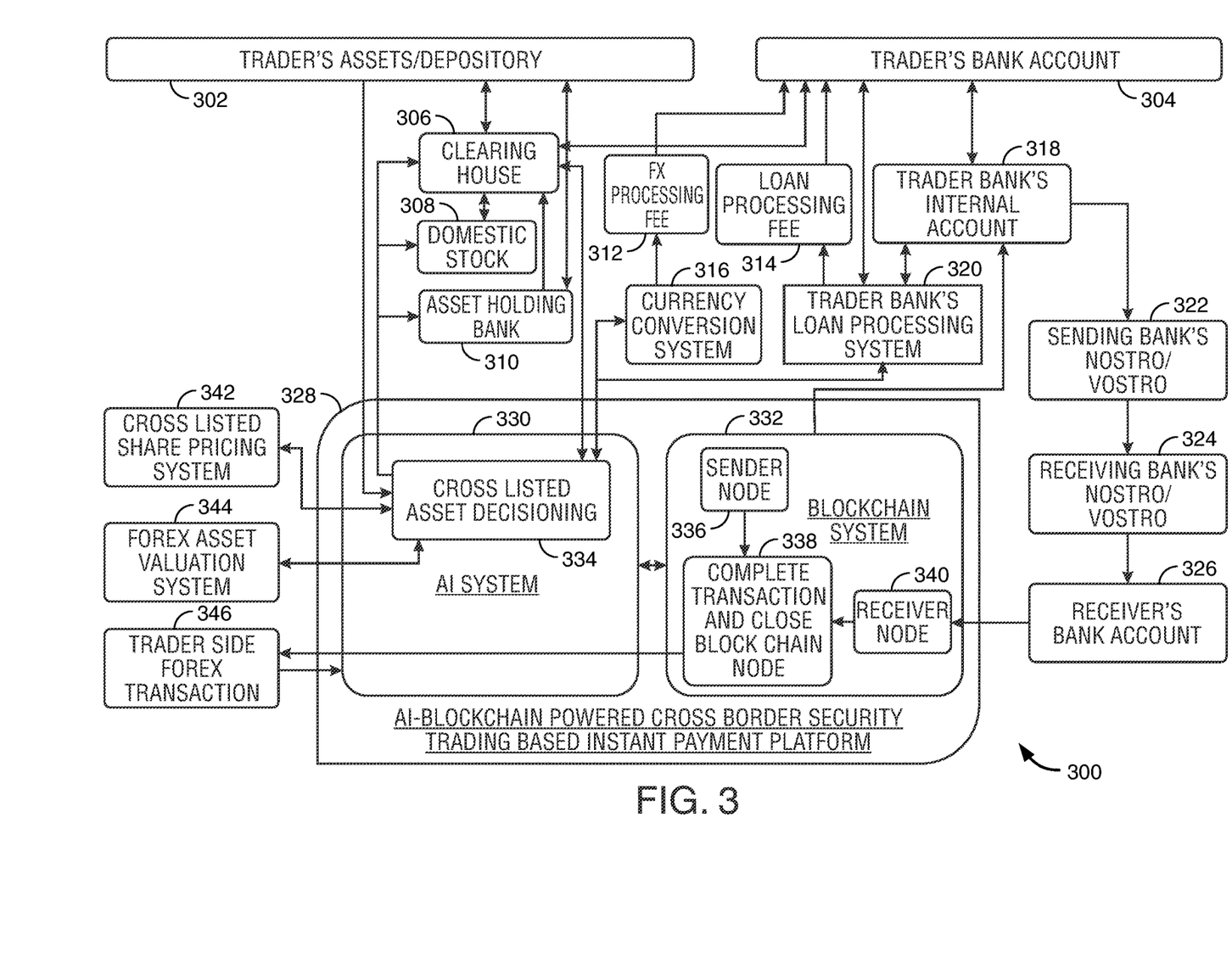
FIG. 3 shows an illustrative diagram in accordance with principles of the disclosure.

FIG. 3 shows illustrative diagram 300 in accordance with principles of the disclosure. Diagram 300 shows a system architecture of an example embodiment of a blockchain-based digital platform for executing a transaction with reduced latency and increased security and efficiency. The system may include depository 302 including a trader entity's assets. The system may be connected to the trader entity's bank account 304. The system may also be connected to a financial institution such as clearing house 306, stock assets (e.g., domestic stock) 308, and/or asset holding bank 310.

The system may include artificial intelligence ("AI") system 330. AI system 330 may include an engine for cross listed asset decisioning 334. The system may include a cross listed share pricing system 342, foreign exchange asset valuation system 344, and/or trader side foreign exchange transaction system 346. AI system 330 may determine cross listed assets of the trader entity, and may also determine a target asset to liquidate based on parameters that may include foreign exchange rates, asset performance metrics, and world events that may be predictive of future trends relating to foreign exchange rates or asset performance metrics.

The system may also include blockchain system 332. Blockchain system 332 may include node 336 hosted by a sender entity and node 340 hosted by a receiver entity. Blockchain 332 may be a secure and visible location for recording aspects of the transaction. Blockchain 332 be an immutable record, generated and visible 24/7 in real-time, of the offers, agreements, and execution of the transaction, and may thereby contribute to the efficiency, security, and low latency of the transactional system.

The system may also include an advancement of funds to execute the transaction, which may, for example, be processed by loan processing system 320 of the trader's bank 318. The transaction may be associated with various fees, including loan processing fee 314 and foreign exchange processing fee 312, which may be connected to currency conversion system 316. The advancement of funds and/or the currency exchange may utilize various financial conventions such as a Nostro/Vostro (financial terms often used when one bank has another bank's money on deposit, typically in relation to international trading or other financial transactions) of a sending bank 322 and receiving bank 324. The system may also be connected to a receiver's bank account 326. When a message is transmitted confirming receipt of the advanced funds according to the terms agreed upon in an entry on the blockchain, the system may further record a blockchain entry confirming execution of the transaction 338.

Figure 4A:
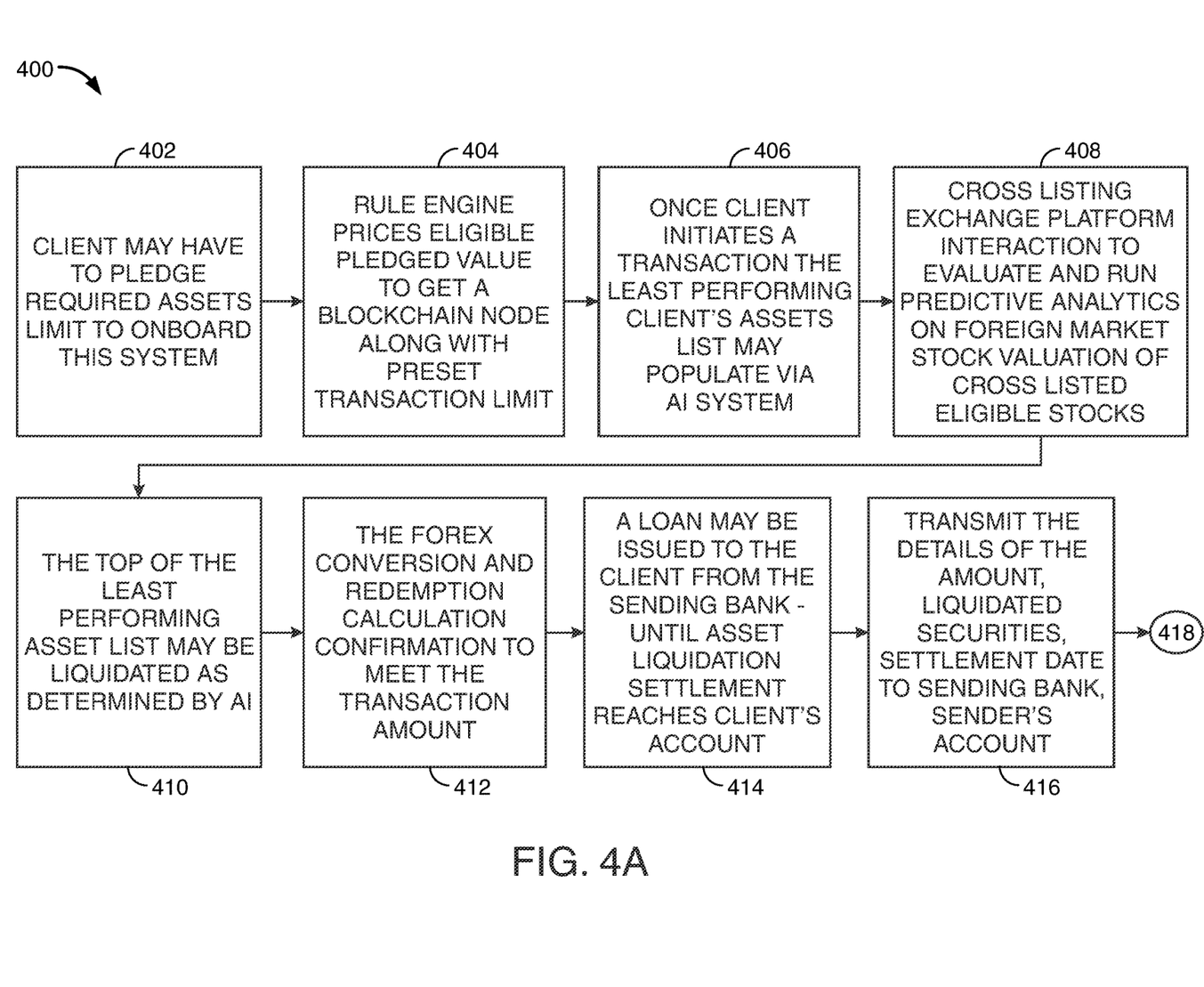
FIGS. 4A-4B show illustrative flowcharts in accordance with principles of the disclosure.
Figure 4B:
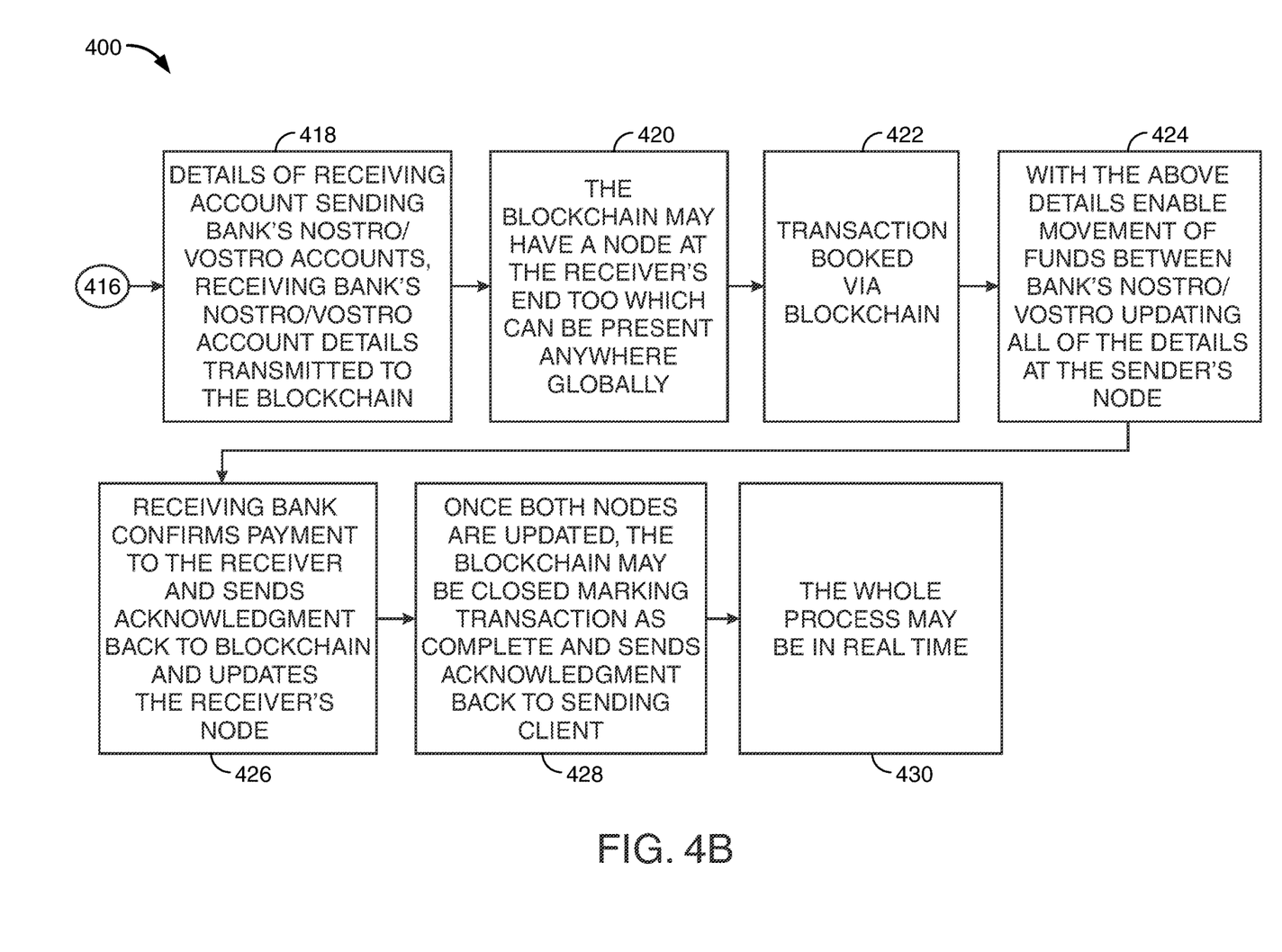

FIGS. 4A-4B show illustrative flowchart 400 in accordance with principles of the disclosure. Flowchart 400 begins with step 402 (shown in FIG. 4A), where a client may have to set certain rules, such as establish an assets limit, to onboard this system. At step 404 the system may use a rule engine to price assets based on an eligible pledged value to get a blockchain node along with preset transaction limit. Once the client initiates a transaction, an AI engine may, at step 406, determine a least performing stock (or asset otherwise determined as optimal to liquidate). The determination may include, at step 408, accessing a cross listing exchange platform to evaluate and run predictive analytics, including foreign market stock valuation of cross listed eligible stocks.

At step 410, the asset determined to be most optimal to liquidate (e.g., the top of the least performing asset list) may be liquidated as determined by AI. The determination may include, at step 412, forex conversion and redemption calculations to confirm meeting the transaction amount. At step 414, a loan may be issued to the client from the sending bank as an advance until asset liquidation settlement reaches the client's account. At step 416, the system may transmit details of the amount, liquidated securities, settlement date, and other suitable transactional details, to a sending bank and/or sender's account.

At step 418 (continued in FIG. 4B), details of the transaction, including sending and receiving accounts, sending Bank's and receiving bank's Nostro/Vostro accounts, may be sent to and recorded on the blockchain. The block chain may also, at step 420, have a node at the receiver's end. The blockchain can be present anywhere globally. At step 422, the transaction may be booked on the blockchain node (e.g., via the receiver node). Based on the aforementioned, the system may thereby, at step 424, enable movement of funds between bank's Nostro/Vostro and update all of the details on the blockchain (e.g., at the sender's node). At step 426, the receiving bank may confirm payment and sends an acknowledgment message back to blockchain and update the receiver's node. Once both nodes are updated, the block chain may, at step 428, be closed, thereby marking the transaction as complete. Acknowledgement may be transmitted back to the sending client. The whole process may, at step 430, be executed in real-time.

Figure 5:
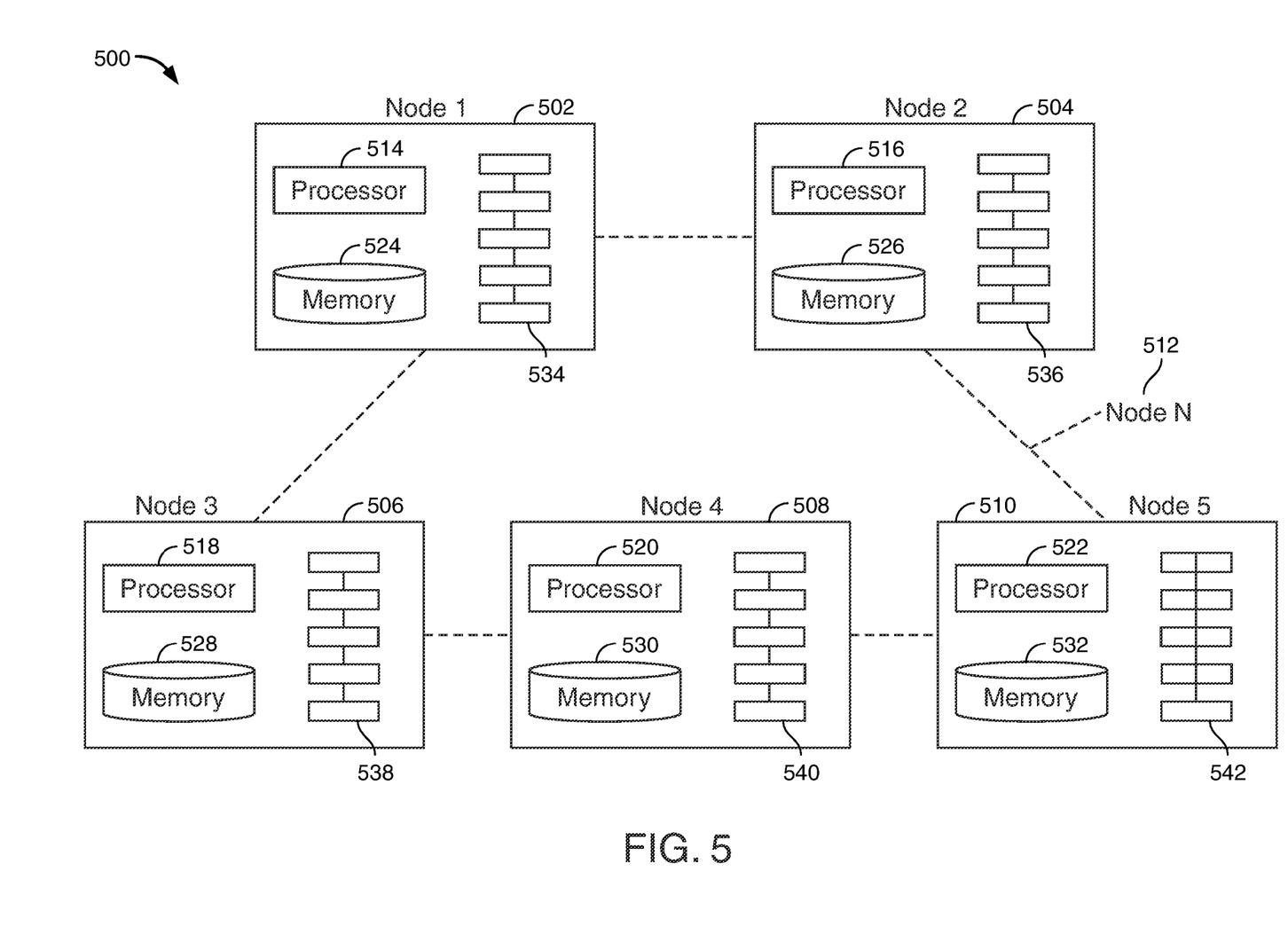
FIG. 5 shows an illustrative diagram in accordance with principles of the disclosure.

FIG. 5 shows illustrative diagram 500 in accordance with principles of the disclosure. Diagram 500 shows an illustrative blockchain including nodes 1-5 (502-510, respectively). The blockchain may include any number of additional nodes 512.

Nodes 1-5 may each include a computer system. For example, nodes 1-5 may include processor (514-522, respectively), memory (524-532, respectively), and distributed ledger (534-542, respectively). The distributed ledger may contain sequential data entries that may be visible and coordinated among all nodes of the blockchain.

The nodes may each be associated with a participant of the system. For example, Node 1 (502) may be associated with a first entity that may be liquidating an asset, Node 2 (504) may be associated with a second entity that may be purchasing the asset, Node 3 (506) may be associated with a financial entity that may be advancing funds for the asset, Node 4 (508) may be associated with an AI system that may be processing the transaction, and Nodes 5-N (510-512) may be associated with a other entities that may be participating in a current or future potential transaction.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for blockchain-based digital exchange platforms with reduced latency and increased security and efficiency are provided. Persons skilled in the art will appreciate that the present invention can be practiced by other than the described embodiments, which are presented for purposes of illustration rather than of limitation, and that the present invention is limited only by the claims that follow.

What is claimed is:

1. A blockchain-based digital exchange platform for executing a transaction with reduced latency and increased security and efficiency, the digital exchange platform comprising:
   a blockchain comprising:
      a distributed ledger;
      a first node comprising a first digital exchange computer system associated with a first entity, wherein the first digital exchange computer system hosts the distributed ledger; and
      a second node comprising a second digital exchange computer system associated with a second entity, wherein the second digital exchange computer system also hosts the distributed ledger;
   an artificial intelligence ("AI") engine that is configured to:
      identify a set of assets of the first entity, wherein the set of assets includes assets that are cross listed in a plurality of asset exchanges;
      calculate an execution suitability index for each asset in the set of assets, wherein the execution suitability index of an asset represents a measure of a level of suitability to execute a liquidation of the asset; and
select a target asset from the set of assets, wherein the target asset is the asset from the set of assets with the highest execution suitability index that also conforms to a set of rules, wherein the set of rules is established by the first entity and comprises an asset category and a transaction limit;
a communication interface;
a digital exchange processor; and
a non-transitory memory storing computer code that, when run on the processor, are configured to:
receive, via the communication interface, an agreement from the second entity to acquire the target asset from the first entity;
record the agreement on the distributed ledger;
receive, via the communication interface, an authorization from a financial institution to advance funds on behalf of the second entity to the first entity for acquisition of the target asset;
transfer the funds from the financial institution to the first entity;
record the transfer of the funds on the distributed ledger;
execute immediately the acquisition of the target asset;
record the acquisition of the target asset on the distributed ledger; and
record the set of rules on the distributed ledger providing a visible, immutable, record of the conditions under which the transaction was agreed upon and providing an accessible exchange platform for participating entities to view conditions under which another entity wishes to execute a future transaction, thereby facilitating a trusted environment with immediate information exchange;
wherein:
the AI engine comprises:
machine-learning ("ML") modules that are trained using data sets containing historical trend data;
a foreign exchange interface, and the foreign exchange interface is configured to compile exchange rates between currencies associated with the plurality of asset exchanges; and
an event interface, and the event interface is configured to receive, as input, a live feed of news events sourced from online media outlets and/or social media;
the exchange rates and the news events are used as factors in calculating the execution suitability indexes; and
the execution suitability index of each asset is calculated based on a plurality of parameters, the plurality of parameters comprising:
a measure of past performance of the asset;
a measure of predicted future performance of the asset; and
a measure of which exchange from the plurality of asset exchanges is most advantageous for liquidating the asset; and
further wherein:
the historical trend data comprises:
the exchange rates;
the news events; and
the plurality of parameters; and
the AI engine is trained by the ML modules with data sets containing the historical trend data; and the AI engine comprises a rule engine, the rule engine is configured to price assets based on an eligible pledged value to obtain a blockchain node with a preset transaction limit; and
the AI engine is further configured to:
1) upon a determination by the AI engine that an asset is most optimal to liquidate, liquidate the asset;
2) move the funds between the first entity and the second entity based on the transaction;
3) update the blockchain with details of the transaction, the first entity and the second entity each confirming the transaction;
4) close the blockchain and mark the transaction complete; and
5) transmit an acknowledgement of the transaction to the processor.

2. The platform of claim 1 further comprising a third node of the blockchain, the third node comprising a third digital exchange computer system associated with the financial institution, wherein the distributed ledger is also hosted on the third digital exchange computer system.

3. The platform of claim 2 further comprising a fourth node of the blockchain, the fourth node comprising a fourth digital exchange computer system associated with the AI engine, wherein the distributed ledger is also hosted on the fourth digital exchange computer system.

4. The platform of claim 1 wherein the set of rules is recorded on the distributed ledger.

5. The platform of claim 1 wherein the acquisition of the target asset is executed even when the plurality of asset exchanges are closed for trading.

6. The platform of claim 1 wherein one of the plurality of asset exchanges comprises a cryptocurrency exchange.

7. A method for executing a transaction with reduced latency and increased security and efficiency on a blockchain-based digital platform, the method comprising:
establishing a first node of a blockchain, the first node comprising:
a first digital exchange computer system associated with a first entity;
a distributed ledger hosted on the first digital exchange computer system; and
a set of rules set by the first entity, the set of rules comprising:
an asset category; and
a transaction limit;
identifying a set of assets of the first entity, wherein the set of assets includes assets that are cross listed in a plurality of asset exchanges;
calculating, via an artificial intelligence ("AI") engine, an execution suitability index for each asset in the set of assets, wherein the execution suitability index of an asset represents a measure of a level of suitability to execute a liquidation of the asset;
selecting, via the AI engine, a target asset from the set of assets, wherein the target asset is the asset from the set of assets with the highest execution suitability index that also conforms to the set of rules;
establishing a second node of the blockchain, the second node comprising a second digital exchange computer system associated with a second entity, wherein the distributed ledger is also hosted on the second digital exchange computer system;
receiving, via a communication interface, an agreement from the second entity to acquire the target asset from the first entity;
recording the agreement on the distributed ledger;

receiving, via the communication interface, an authorization from a financial institution to advance funds on behalf of the second entity to the first entity for acquisition of the target asset;
transferring the funds from the financial institution to the first entity;
recording the transfer of the funds on the distributed ledger;
executing immediately the acquisition of the target asset;
recording the acquisition of the target asset on the distributed ledger; and
recording the set of rules on the distributed ledger providing a visible, immutable, record of the conditions under which the transaction was agreed upon and providing an accessible exchange platform for participating entities to view conditions under which another entity wishes to execute a future transaction, thereby facilitating a trusted environment with immediate information exchange;
wherein:
the AI engine comprises:
machine-learning ("ML") modules that are trained using data sets containing historical trend data;
a foreign exchange interface, and the foreign exchange interface is configured to compile exchange rates between currencies associated with the plurality of asset exchanges; and
an event interface, and the event interface is configured to receive, as input, a live feed of news events sourced from online media outlets and/or social media;
the exchange rates and the news events are used as factors in calculating the execution suitability indexes; and
the execution suitability index of each asset is calculated based on a plurality of parameters, the plurality of parameters comprising:
a measure of past performance of the asset;
a measure of predicted future performance of the asset; and
a measure of which exchange from the plurality of asset exchanges is most advantageous for liquidating the asset; and
further wherein:
the historical trend data comprises:
the exchange rates;
the news events; and
the plurality of parameters; and
the AI engine is trained by the ML modules with data sets containing the historical trend data; and the AI engine comprises a rule engine, the rule engine is configured to price assets based on an eligible pledged value to obtain a blockchain node with a preset transaction limit; and
the AI engine is further configured to:
1) upon a determination by the AI engine that an asset is most optimal to liquidate, liquidate the asset;
2) move the funds between the first entity and the second entity based on the transaction;
3) update the blockchain with details of the transaction, the first entity and the second entity each confirming the transaction;
4) close the blockchain and mark the transaction complete; and
5) transmit an acknowledgement of the transaction to the processor.

8. The method of claim 7 further comprising establishing a third node of the blockchain, the third node comprising a third digital exchange computer system associated with the financial institution, wherein the distributed ledger is also hosted on the third digital exchange computer system.

9. The method of claim 8 further comprising establishing a fourth node of the blockchain, the fourth node comprising a fourth digital exchange computer system associated with the AI engine, wherein the distributed ledger is also hosted on the fourth digital exchange computer system.

10. The method of claim 7 wherein the set of rules is recorded on the distributed ledger.

11. The method of claim 7 wherein the acquisition of the target asset is executed even when the plurality of asset exchanges are closed for trading.

12. The method of claim 7 wherein one of the plurality of asset exchanges comprises a cryptocurrency exchange.

13. A blockchain-based digital exchange platform for executing a transaction with reduced latency and increased security and efficiency, the digital exchange platform comprising:
a blockchain comprising:
a distributed ledger;
a first node comprising a first digital exchange computer system associated with a first entity, wherein the first digital exchange computer system hosts the distributed ledger;
a second node comprising a second digital exchange computer system associated with a second entity, wherein the second digital exchange computer system also hosts the distributed ledger;
a third node comprising a third digital exchange computer system associated with a financial institution, wherein the third digital exchange computer system also hosts the distributed ledger; and
a fourth node comprising a fourth digital exchange computer system associated with an artificial intelligence ("AI") engine, wherein:
the fourth digital exchange computer system also hosts the distributed ledger; and
the AI engine is configured to:
identify a set of assets of the first entity, wherein the set of assets includes assets that are cross listed in a plurality of asset exchanges;
calculate an execution suitability index for each asset in the set of assets, wherein the execution suitability index of an asset represents a measure of a level of suitability to execute a liquidation of the asset; and
select a target asset from the set of assets, wherein the target asset is the asset from the set of assets with the highest execution suitability index that also conforms to a set of rules, wherein the set of rules is established by the first entity and comprises an asset category and a transaction limit;
a communication interface;
a processor; and
a non-transitory memory storing computer code that, when run on the processor, are configured to:
receive, via the communication interface, an agreement from the second entity to acquire the target asset from the first entity;
record the agreement on the distributed ledger;
receive, via the communication interface, an authorization from the financial institution to advance funds on behalf of the second entity to the first entity for acquisition of the target asset;

transfer the funds from the financial institution to the first entity;
record the transfer of the funds on the distributed ledger;
execute immediately the acquisition of the target asset;
record the acquisition of the target asset on the distributed ledger; and
record the set of rules on the distributed ledger providing a visible, immutable, record of the conditions under which the transaction was agreed upon and providing an accessible exchange platform for participating entities to view conditions under which another entity wishes to execute a future transaction, thereby facilitating a trusted environment with immediate information exchange;

wherein:
the AI engine comprises:
machine-learning ("ML") modules that are trained using data sets containing historical trend data;
a foreign exchange interface, and the foreign exchange interface is configured to compile exchange rates between currencies associated with the plurality of asset exchanges; and
an event interface, and the event interface is configured to receive, as input, a live feed of news events sourced from online media outlets and/or social media;
the exchange rates and the news events are used as factors in calculating the execution suitability indexes; and
the execution suitability index of each asset is calculated based on a plurality of parameters, the plurality of parameters comprising:
a measure of past performance of the asset;
a measure of predicted future performance of the asset; and
a measure of which exchange from the plurality of asset exchanges is most advantageous for liquidating the asset; and further wherein:
the historical trend data comprises:
the exchange rates;
the news events; and
the plurality of parameters; and
the AI engine is trained by the ML modules with data sets containing the historical trend data; and the AI engine comprises a rule engine, the rule engine is configured to price assets based on an eligible pledged value to obtain a blockchain node with a preset transaction limit; and
the AI engine is further configured to:
1) upon a determination by the AI engine that an asset is most optimal to liquidate, liquidate the asset;
2) move the funds between the first entity and the second entity based on the transaction;
3) update the blockchain with details of the transaction, the first entity and the second entity each confirming the transaction;
4) close the blockchain and mark the transaction complete; and
5) transmit an acknowledgement of the transaction to the processor.

* * * * *